(12) United States Patent
Hough et al.

(10) Patent No.: US 7,095,020 B2
(45) Date of Patent: Aug. 22, 2006

(54) SENSING MODE ATOMIC FORCE MICROSCOPE

(75) Inventors: Paul V. C. Hough, Port Jefferson, NY (US); Chengpu Wang, Upton, NY (US)

(73) Assignee: Brookhaven Science Associates, Upton, NY (US)

( * ) Notice: Subject to any disclaimer, the term of this patent is extended or adjusted under 35 U.S.C. 154(b) by 190 days.

(21) Appl. No.: 10/933,591

(22) Filed: Sep. 3, 2004

(65) Prior Publication Data

US 2005/0029450 A1     Feb. 10, 2005

Related U.S. Application Data

(63) Continuation of application No. 09/591,051, filed on Jun. 9, 2000, now Pat. No. 6,818,891, which is a continuation-in-part of application No. 09/054,809, filed on Apr. 3, 1998, now Pat. No. 6,518,570.

(51) Int. Cl.
  *H01J 37/28* (2006.01)
(52) U.S. Cl. .................. 250/306; 250/307; 73/105
(58) Field of Classification Search ............... 250/306, 250/307; 73/105
  See application file for complete search history.

(56) References Cited

U.S. PATENT DOCUMENTS

| | | | | |
|---|---|---|---|---|
| 5,077,473 A | * | 12/1991 | Elings et al. | 250/306 |
| 5,168,159 A | * | 12/1992 | Yagi | 250/306 |
| 5,965,881 A | * | 10/1999 | Morimoto et al. | 250/234 |
| RE36,488 E | * | 1/2000 | Elings et al. | 250/234 |

* cited by examiner

*Primary Examiner*—Nikita Wells
*Assistant Examiner*—Anthony Quash
(74) *Attorney, Agent, or Firm*—Morgan & Finnegan, LLP

(57) ABSTRACT

An atomic force microscope is described having a cantilever comprising a base and a probe tip on an end opposite the base; a cantilever drive device connected to the base; a magnetic material coupled to the probe tip, such that when an incrementally increasing magnetic field is applied to the magnetic material an incrementally increasing force will be applied to the probe tip; a moveable specimen base; and a controller constructed to obtain a profile height of a specimen at a point based upon a contact between the probe tip and a specimen, and measure an adhesion force between the probe tip and the specimen by, under control of a program, incrementally increasing an amount of a magnetic field until a release force, sufficient to break the contact, is applied. An imaging method for atomic force microscopy involving measuring a specimen profile height and adhesion force at multiple points within an area and concurrently displaying the profile and adhesion force for each of the points is also described. A microscope controller is also described and is constructed to, for a group of points, calculate a specimen height at a point based upon a cantilever deflection, a cantilever base position and a specimen piezo position; calculate an adhesion force between a probe tip and a specimen at the point by causing an incrementally increasing force to be applied to the probe tip until the probe tip separates from a specimen; and move the probe tip to a new point in the group.

5 Claims, 13 Drawing Sheets
(5 of 13 Drawing Sheet(s) Filed in Color)

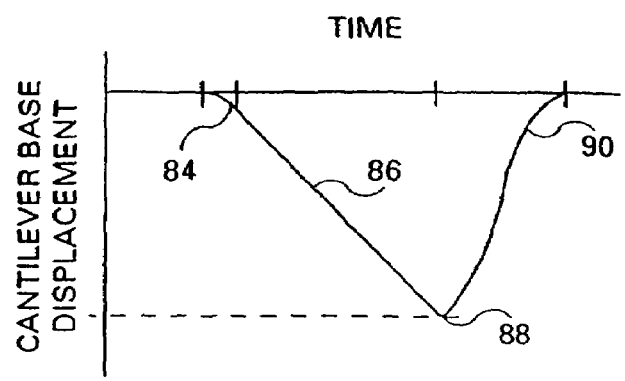
FIGURE 5a
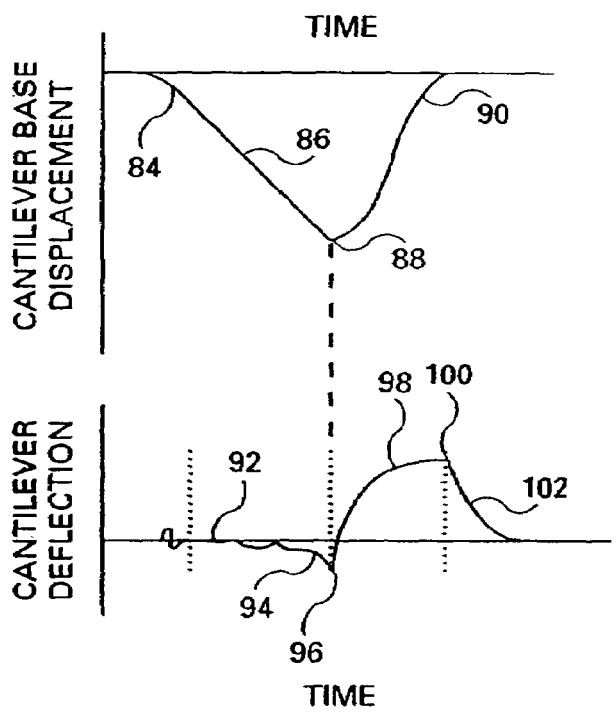
FIGURE 5b
FIGURE 5c
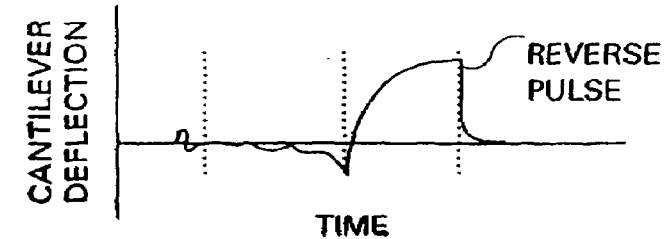
FIGURE 5d

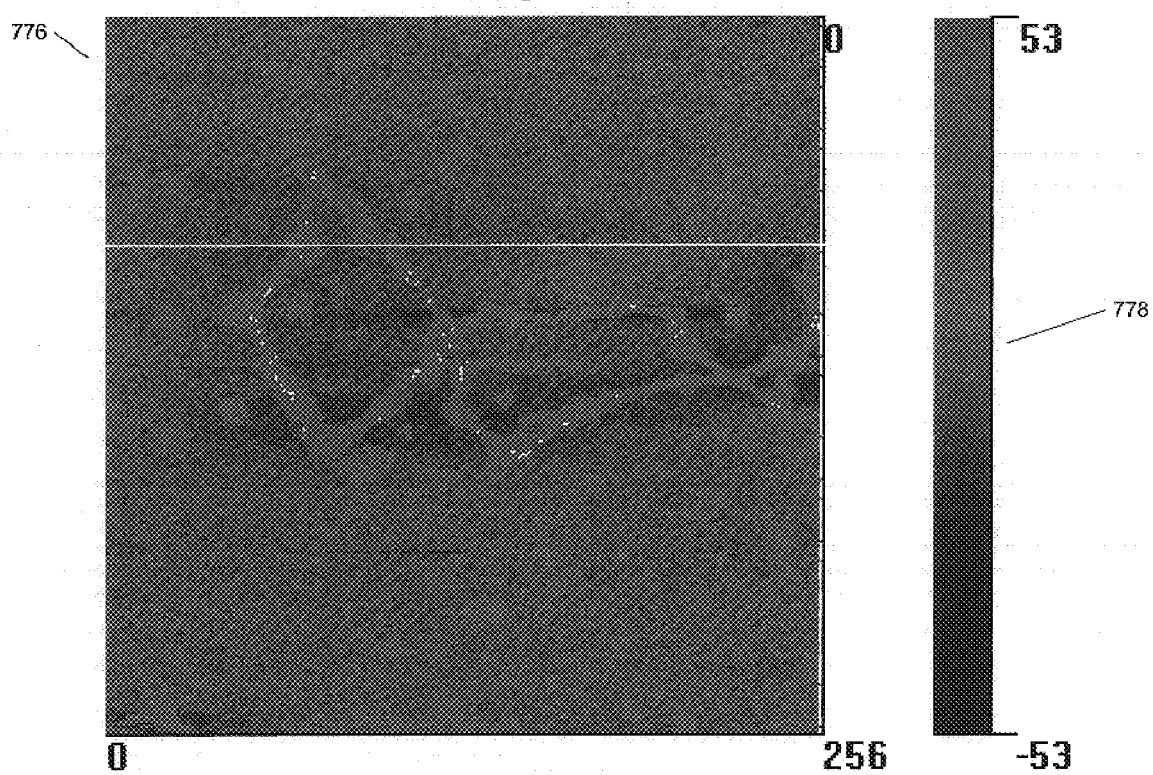

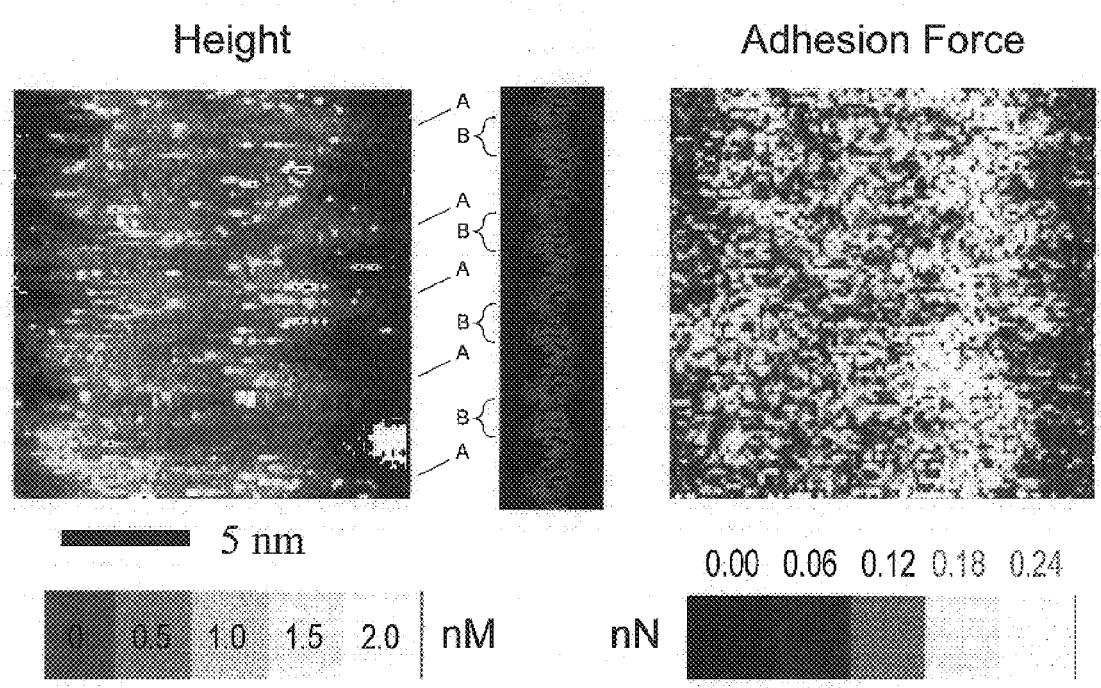

SENSING MODE ATOMIC FORCE MICROSCOPE

CROSS REFERENCE TO RELATED APPLICATIONS

This is a continuation application which claims the benefit of priority to U.S. application Ser. No. 09/591,051, filed Jun. 9, 2000, which issued as U.S. Pat. 6,818,891. U.S. application Ser. No. 09/591,051, in turn, which is a continuation in part of and claims the benefit of priority to U.S. application Ser. No. 09/054,809, which was filed Apr. 3, 1998 and issued as U.S. Pat. No. 6,518,570.

This invention was made with Government support under contract number DE-AC02-98CH 10886, awarded by the U.S. Department of Energy. The Government has certain rights in the invention.

FIELD OF THE INVENTION

The present invention generally relates to the field of atomic force microscopy and, more particularly, to control of an atomic force microscope.

BACKGROUND OF THE INVENTION

The present invention relates generally to atomic force microscopy and more particularly relates to an atomic force microscope and controller which minimize contact forces between a probe tip and a specimen and is well suited for the study of biological specimens.

In the study of biology, it is desirable to observe biological specimens under very high magnification in a native environment. Such observations allow scientists to monitor, in real time, biological processes at the molecular and sub-molecular level. Such processes include the interaction of proteins with DNA and with each other. Currently, these processes cannot be observed in real time with electron microscopes or x-ray crystallography techniques which are known in the art, as the specimens are not in their native environment when using these apparatuses. Accordingly, scientists have sought alternate methods to observe biological specimens. One such alternative is known as the atomic force microscope.

Atomic force microscopes (AFM), which are generally known in the art, physically probe a specimen to create an image of the specimen's surface. FIG. 1 illustrates a typical embodiment of an AFM known in the art. The AFM has two primary components, a scanner 10 and a flexible cantilever 12 having a probe tip 14 on a free end. The scanner 10 has a top surface 16 on which a specimen 18 to be imaged is placed. The scanner 10 typically employs three piezoelectric elements 20, 22, 24 to move the specimen 18 in three dimensions, X Y and Z, relative to the position of the probe tip 14. The probe tip 14 is affixed to the free end of the flexible cantilever 12 and contacts the specimen 18. The AFM includes a laser 26 directed onto the cantilever 12 and a photo detector 28 which is responsive to laser light to measure the deflection of the cantilever 12. As the degree of cantilever deflection is proportional to the contacting force between the probe tip 14 and the specimen 18, such force can accurately be calculated based on the angle of cantilever deflection.

To create an image of a specimen, the scanner 10 directs the specimen 18 in a raster-scan fashion in the X-Y direction while continuously sampling the contour of the specimen 18 in the Z direction. The sampling is generally performed using one of two techniques known in the art, namely contact mode or tapping mode. In contact mode, the scanner 10 is controlled in the Z direction such that the contacting force between the probe tip 14 and the specimen 18 is substantially constant. As the contour of the specimen changes, the deflection of the cantilever 12 also changes and a servo system driving the scanner 10 adjusts the Z coordinate of the scanner 10 to restore the desired constant force. At each specimen point, the coordinate of the Z axis is indicative of the specimen contour. Because the probe is constantly contacting (i.e. it drags along) the surface of the specimen during the X-Y raster scan, significant lateral forces are applied to both the specimen 18 and the probe tip 14. The probe tip 14, which is typically 200–300 Angstroms in diameter is subject to rapid wear and breakage under these forces. Also, when used on soft specimens, such as biological specimens, the probe tip is likely to destroy the surface of the specimen, making accurate and repeatable measurements impossible.

In tapping mode, the cantilever 12 is driven in an oscillatory fashion at the resonant frequency of the cantilever. This may be achieved by affixing the cantilever to a piezoelectric element 30 and driving the piezoelectric element 30 with a voltage signal at the resonant frequency of the cantilever. To determine the contour of the specimen in tapping mode, the scanner 10 moves the specimen in the Z direction until a predetermined reduction in oscillation amplitude is detected. The reduction in oscillation amplitude is the result of the probe tip 14 contacting the surface of the specimen 18 during each cycle of oscillation. Because the probe tip 14 repeatedly, but only momentarily contacts the specimen 18 at each point during the X-Y raster scan, the lateral force present during contact mode is substantially reduced. However, because the probe tip 14 is moving rapidly on arrival at the specimen surface, the contacting force, while short in duration, is large in magnitude. The force that results from tapping mode tends to be destructive to biological specimens. Thus, tapping mode is most useful in sampling hard surfaces, such as those found in integrated circuit manufacturing processes and the like. Also, tapping mode is difficult to use when measuring a fluid-based specimen. When the cantilever assembly is submerged into a fluid environment, the desired oscillation of the cantilever can be dampened and additional resonances are developed which can adversely affect operation and accuracy. Also, fluid flow induced by the tapping oscillation tends to erode the specimen. Because biological specimens tend to reside in a fluid environment, tapping mode is not well suited for measuring these specimens. Tapping mode is also incapable of separately measuring the contacting force and adhesion force at each pixel. Because tapping mode cannot separate the two forces, concurrent mapping of each force during scanning is presently not possible with AFM's employing tapping mode.

An alternative operating mode to both contact mode and tapping mode is described in U.S. Pat. No. 5,229,606 to Elings et al. Elings et al. refers to "jump scanning" where the probe is momentarily brought into contact with the surface to be measured. The probe is then lifted away from the surface as the specimen is moved in the X direction and the probe tip is then brought back down into contact to take the next specimen. By jumping over the surface of the specimen, Elings et al. teach a method of increasing scanning speed with reduced risk of probe damage. However, when the probe tip and specimen contact one another, an attractive force tends to hold the probe tip in contact with the specimen. To ensure that the probe tip is able to release, the cantilever 12 must be formed with a sufficient spring constant to overcome this attractive force. Unfortunately, increasing the spring constant of the cantilever 12 increases the magnitude of the contact force between the probe tip 14 and specimen 18 which is required to achieve a measurable cantilever 12 deflection. Such stiff cantilevers, i.e., in the range greater than 0.1 Newtons per meter (N/m), which are required for jump mode, are incompatible with the more sensitive biological specimens which are easily damaged under the application of such forces.

The problem of overcoming the attractive forces between an AFM probe tip 14 and specimen surface was addressed in U.S. Pat. No. 5,515,719 to Lindsay. Lindsay operates in a mode where contact between the probe tip 14 and specimen surface is considered to be undesirable and recognized that when soft (low spring constant) cantilevers are used, the attractive interaction between the specimen 18 and probe tip 14 tends to draw the probe tip in and the probe tip 14 will contact and stick to the surface until enough force is applied to the cantilever base to release the probe tip 14. To address this problem, Lindsay teaches the addition of a magnetic particle attached to the cantilever in combination with a magnetic solenoid located proximate to the cantilever. The solenoid generates a magnetic field which is variable and precisely regulated by a servo circuit. The servo circuit monitors the deflection of the cantilever and continuously adjusts the magnetic field such that the attractive force between the probe tip 14 and specimen 18 is substantially neutralized. In this way, the probe tip 14, as taught by Lindsay, is kept at a distance from the specimen and never makes contact with the specimen. Therefore, it is impossible to measure an adhesion force using this method and difficult to measure the specimen profile at high lateral resolution because of the tip-specimen separation.

The use of a magnetic particle affixed to a flexible cantilever and controlled by a magnetic coil as used by Lindsay was first disclosed in an article by Florin et al., entitled "Atomic Force Microscope with Magnetic Force Modulation", published in the Review of Scientific Instrument, 65(3), March 1994. Florin et al. teach the use of a magnetic control system to drive the cantilever in an oscillating fashion such that the probe tip momentarily and adversely contacts a specimen, in a manner similar to tapping mode.

Current AFM techniques tend to be destructive to biological specimens. Therefore, there remains a need for an improved atomic force microscope adapted for use in a fluid medium: for the observation of biological specimens in their native environment under conditions completely controlling and quantitatively measuring the interaction forces between tip and specimen.

SUMMARY OF THE INVENTION

We have created an advance in the atomic force microscope field which improves operability and/or enables atomic force microscope usability in material science, genomics, proteomics, polymer science, and biomedicine by allowing observation of and data collection from biological specimens in their native environment.

It is another object of the present invention to provide an atomic force microscope which provides a controlled, angstrom by angstrom approach of the probe tip to the specimen.

It is yet another object of the present invention to provide an atomic force microscope which applies minimal vertical force to the specimen being measured.

It is still another object of the present invention to provide an atomic force microscope featuring substantially zero lateral force applied to the specimen during a raster scan.

It is a further object of the present invention to provide an atomic force microscope using a low spring force cantilever which overcomes the problem of probe tip retention resulting from adhesive forces between the probe tip and specimen.

It is still a further object of the present invention to provide an atomic force microscope capable of using a probe tip with a diameter less than 100 Angstroms.

It is still another object of the present invention to provide an atomic force microscope which is able to generate repeatable scan to scan measurement results on biological specimens.

It is yet another object of the present invention to provide an atomic force microscope suitable for monitoring biological processes in real time.

It is still another object of the present invention to provide an atomic force microscope which substantially continuously monitors both cantilever displacement relative to specimen and cantilever deflection.

It is yet another object of the present invention to provide an atomic force microscope which is responsive to changes in cantilever deflection within five microseconds.

It is yet a further object of the present invention to provide an atomic force microscope capable of recording and outputting complete force curves for all pixels in a specimen scan.

For better understanding of the present invention, together with other and further objects and advantages, reference is made to the following description, taken in conjunction with the accompanying drawings, and its scope will be pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 5E:
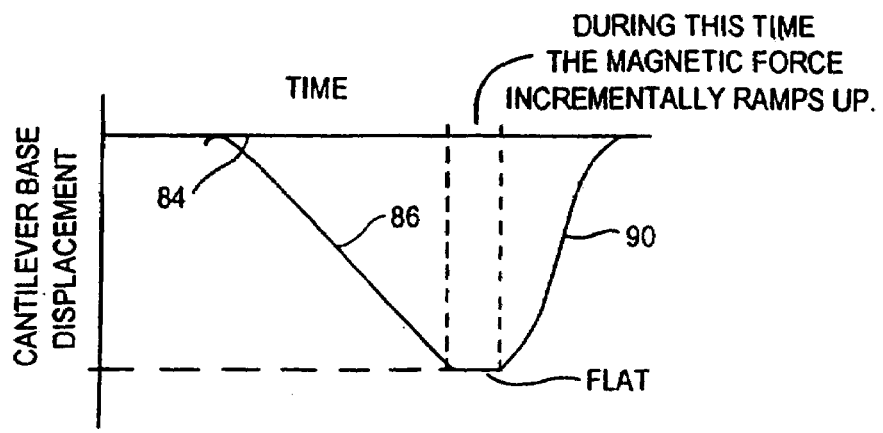
FIG. 5E is a graph depicting the full range of cantilever base motion incorporating a pause for incremental ramp up of the magnetic withdrawal force.
Figure 5F:
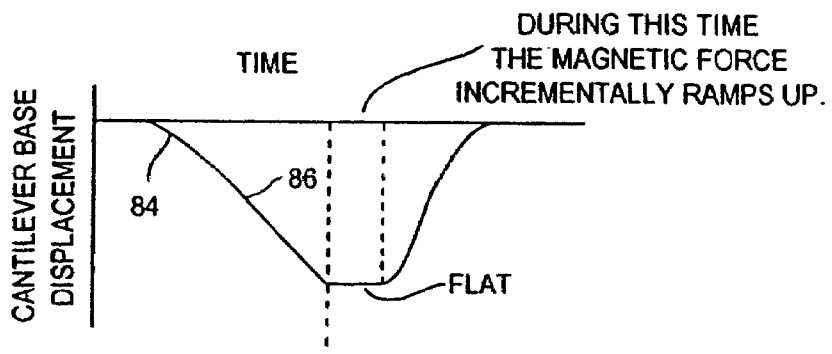
FIG. 5F is a graph depicting cantilever base motion truncated by the detection of probe tip contact and incorporating a pause after contact. The deflection occurring in FIG.
Figure 5G:
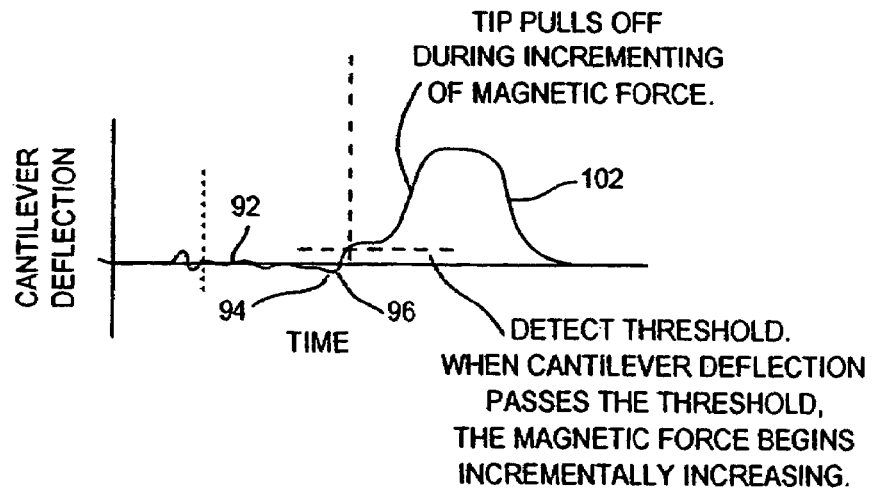
FIG. 5A is a graph depicting the full range of cantilever base motion.
FIG. 5B is a graph depicting cantilever base motion truncated by the detection of probe tip contact.
FIG. 5C is a graph depicting cantilever deflection versus time and corresponds in time with the graph in FIG. 5B.
FIG. 5D is a graph depicting cantilever deflection versus time with the application of a reverse polarity pulse release signal, restoring the cantilever to a neutral position.
Figure 6:
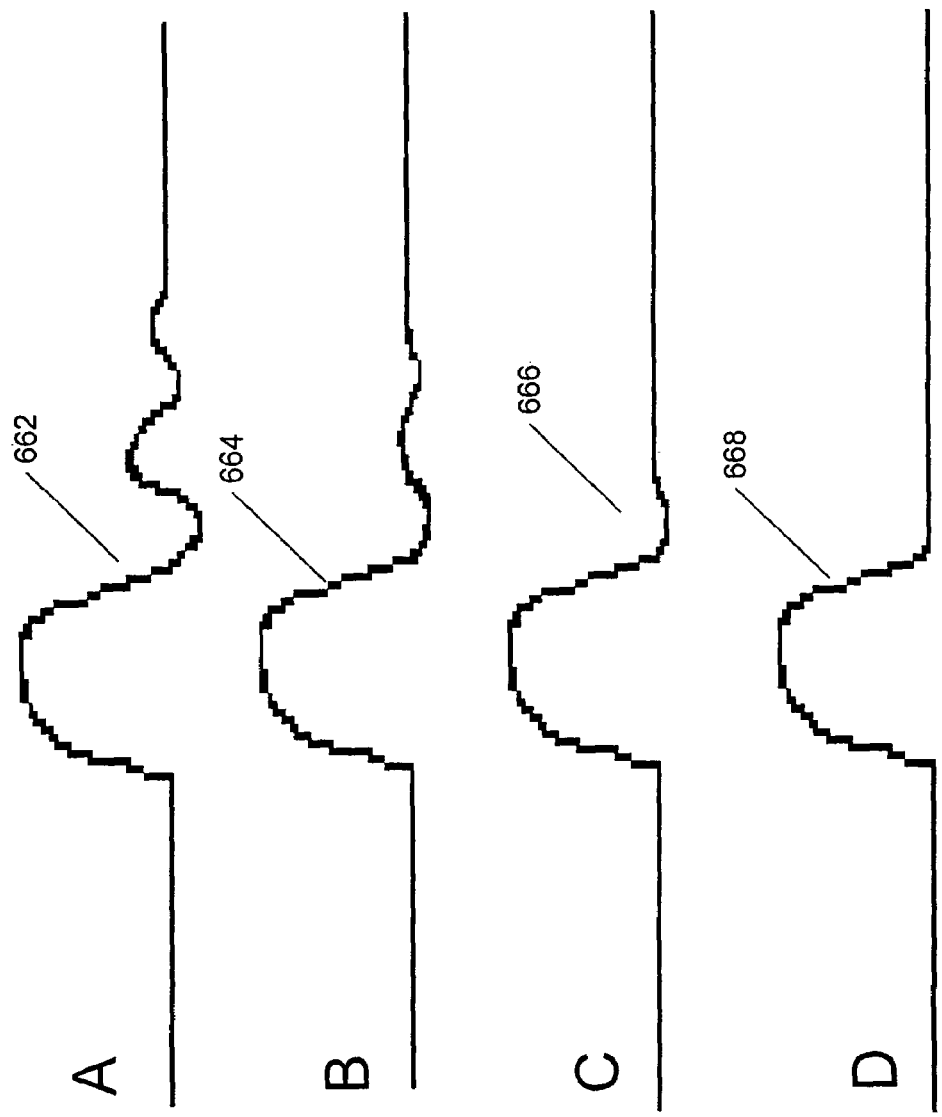
Figure 7A:
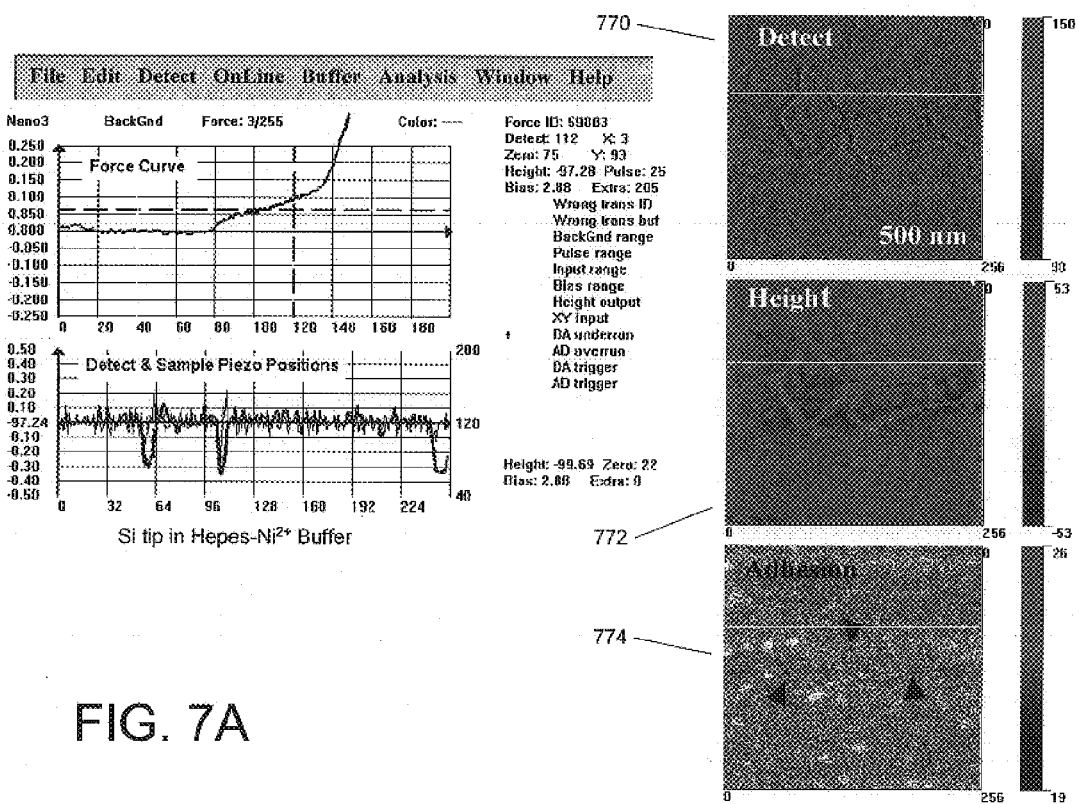
Figure 8:
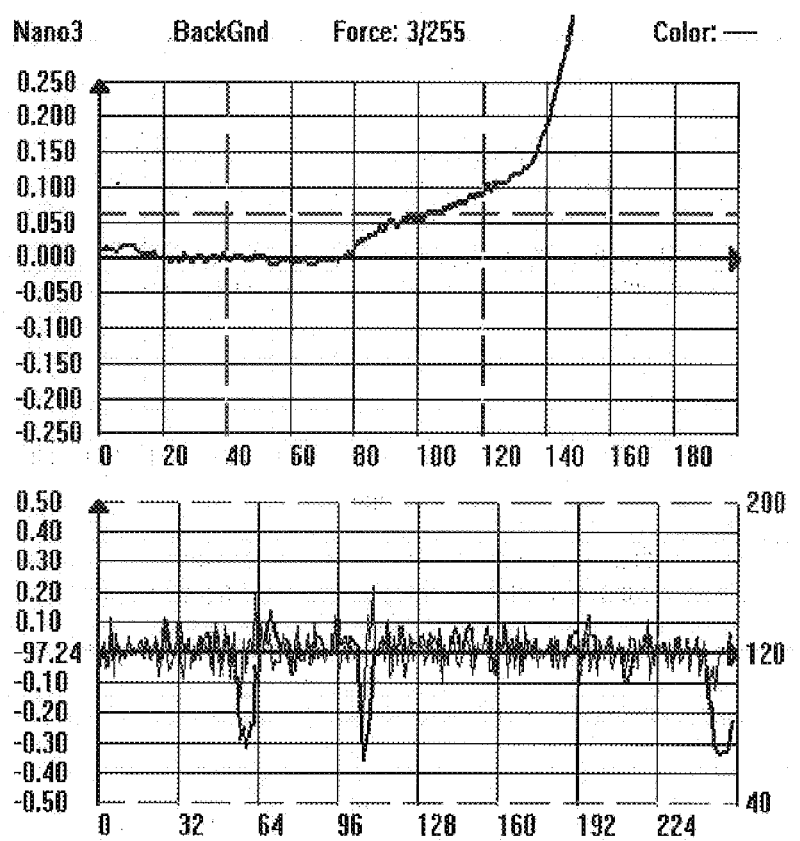
Figure 9:
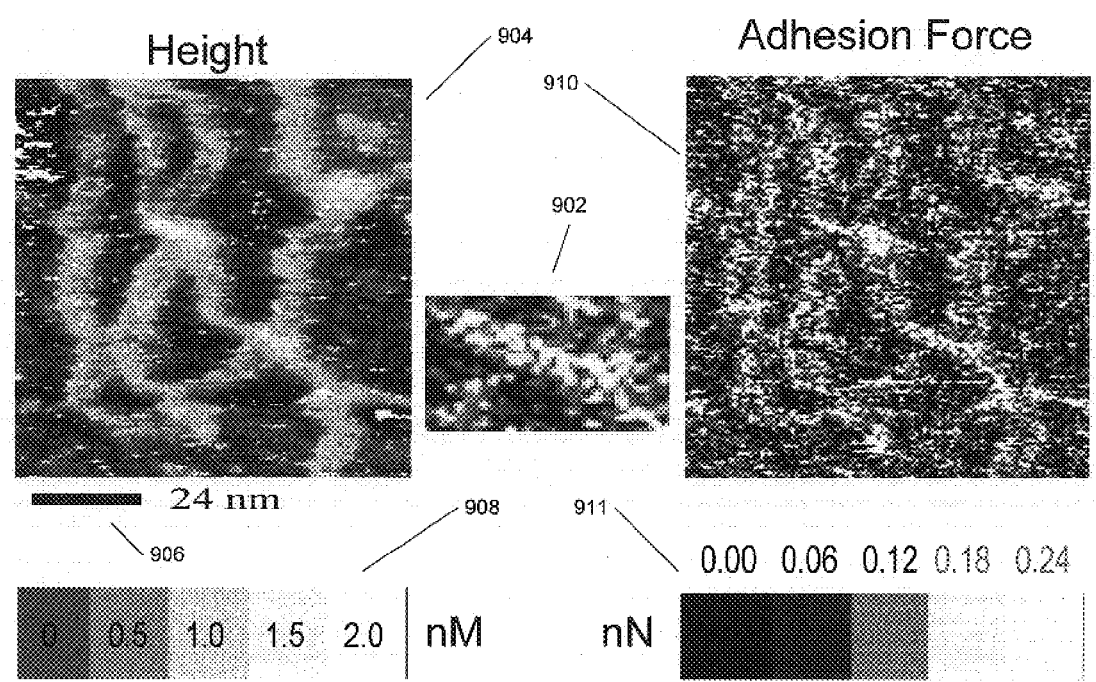

5F is stopped by contact with the specimen at a point intermediate to the full deflection illustrated in FIG. 5E;

FIG. 5G is a graph depicting cantilever deflection versus time and corresponds in time with the graph in FIG. 5F;

FIG. 6 shows a sequence of responses of the cantilever to a given release force during engagement;

FIG. 7A is an example display of concurrent light and adhesion force information obtained from scanning a DNA sample available through use of the invention;

FIG. 7B is an enlarged view of image 772 of FIG. 7A;

FIG. 8 is an enlarged view of the graphs of FIG. 7A;

FIG. 9 is an image of several segments of DNA helix obtained using the techniques described herein; and FIG. 10 is a higher magnification image of DNA obtained using the invention.

DETAILED DESCRIPTION OF THE INVENTION

Figure 1:
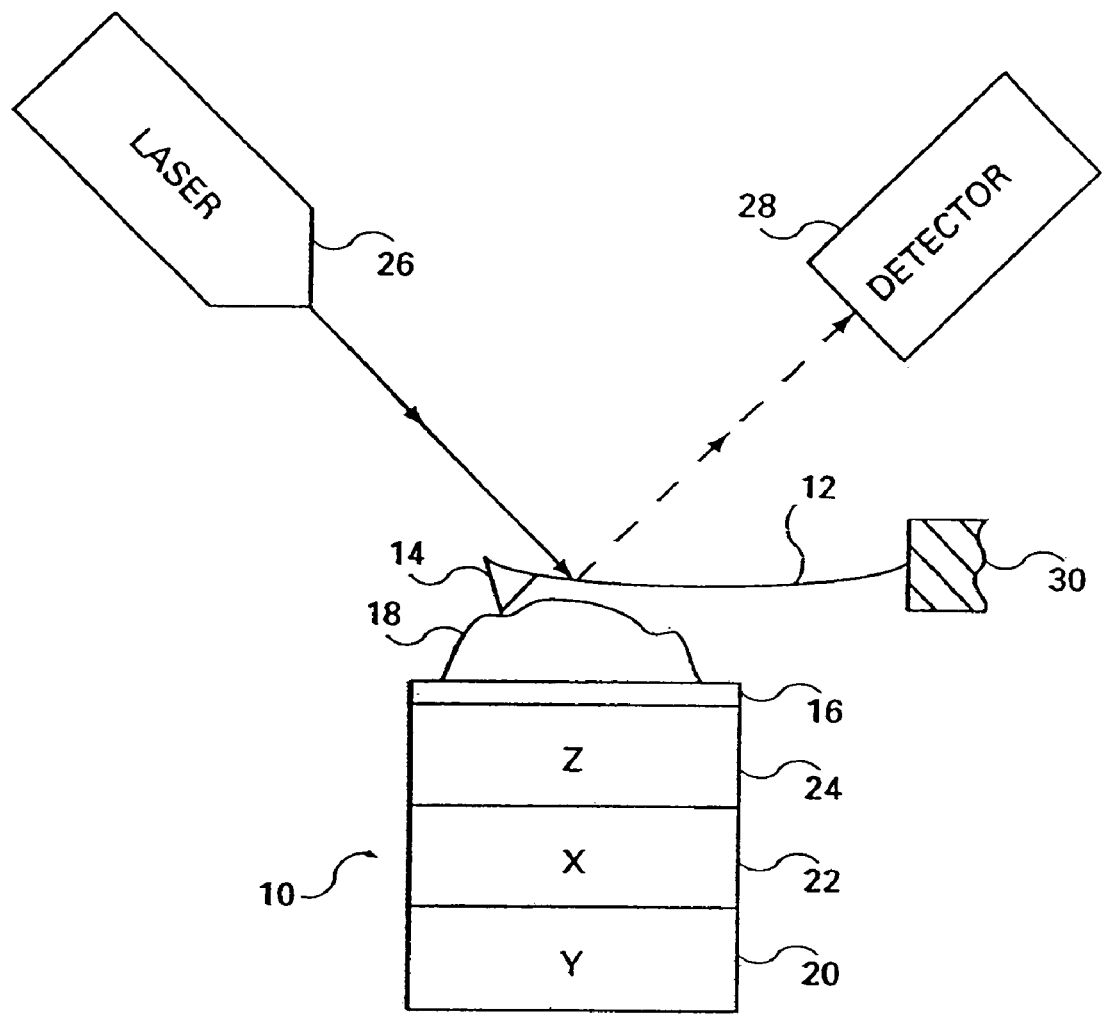
FIG. 1 is a block diagram of an atomic force microscope formed in a manner known in the prior art.
Figure 2:
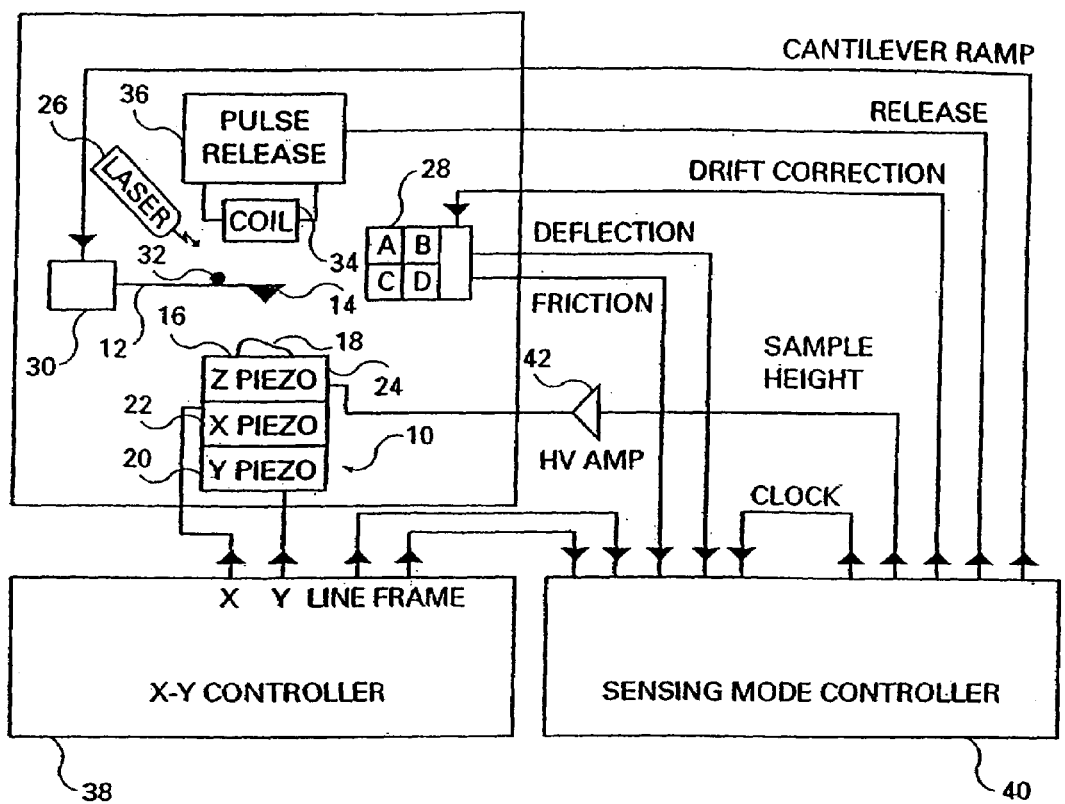
FIG. 2 is a block diagram of a sensing mode atomic force microscope formed in accordance with the present invention.

FIG. 2 is a block diagram generally depicting an atomic force microscope (AFM) formed in accordance with the present invention. The AFM includes a scanner 10 formed in a conventional manner having an X-piezo element 22, a Y-piezo element 20 and a Z-piezo element 24. The scanner 10 has an upper specimen surface 16 on which a specimen 18 to be measured is placed. The X, Y and Z piezo elements each change dimension, in a conventional fashion, in three mutually perpendicular axes, in response to a received control voltage signal. An X-Y controller circuit 38 is included. The X-Y controller circuit 38 controls the X-piezo element 22 and the Y-piezo element 20, generating a conventional raster scan of the specimen surface 16. Several commercially available controllers can provide this function. For example, the NanoScope E controller, manufactured by Digital Instruments, Inc. of Santa Barbara, Calif. is suitable for this application.

A sensing mode controller circuit 40 is also included and controls the Z-piezo element 24 in accordance with a method of the present invention. The sensing mode controller 40 can be implemented using a Pentium II Personal Computer and a DT3809 multifunction Input/Output Card, having a Texas Instruments C40 Digital Signal Processor (DSP) Integrated Circuit. It is contemplated by the inventors, and will be appreciated by those skilled in the art, that the functions of the X-Y controller circuit 38 and sensing mode controller circuit 40 can be performed by a single controller unit.

The AFM further includes a flexible cantilever 12 which has a first end affixed to a vertically displaceable (Z-axis) cantilever base 30. The cantilever base 30 preferably takes the form of a piezoelectric element which changes dimension in the Z-axis in a controlled fashion in response to a received control voltage signal provided by the sensing mode controller circuit 40. The flexible cantilever 12, shown in detail in FIG. 3, has a free end on which a probe tip 14 is affixed. The probe tip 14 is formed from a material such as silicon nitride or silicon, and is generally sharpened to a diameter less than 20 nanometers (nm). Suitable probe tips are currently manufactured by Digital Instruments, of Santa Barbara, Calif. Alternatively, single wall (1 nm diameter) or multiwall carbon nanotubes (5–20 nm diameter) or non-carbon nanotubes such as molybdenum sulfide ($MoS_2$) and tungsten sulfide ($WS_2$) (20–40 nm down to 1 nm diameter) can also be used. Advantageously, the nanotubes can be used in underivatized form or derivatized form. For example, defined functional groups can be added covalently at the end of the nanotube which has been oxidized, using known crosslinking reagents and linker molecules. A suitable coupling reagent could use carbodimide chemistry. Examples of functional groups include amines, methyls, benzyls and nucleosides. These defined functional groups will allow chemical-force probing on a molecular or pixel-by-pixel basis, i.e. at full resolution and in exact register with the height map. Advantageously, by using a single defined molecule on the probe tip, the binding energy between the molecule on the tip and the specimen can be measured.

The 1 nm (10 Angstroms) single wall carbon nanotubes have great potential as probe tips. Mounted on the end of a cantilever, these tips can provide for force measurements and profile height measurements especially in fluids at a resolution previously unachievable with prior art AFM technology. In particular, interstitial molecular force measurement within lattice-type structures can be studied.

As a general matter, Si tips have proved difficult to use in biological AFM. However, in applying the principles described herein, Si tips can be used to image DNA topography well even in buffer and with rescanning and a nominal force constant of the Si cantilever as low as 0.05 N/m.

As noted above, probe tips made up of multiwall or single wall nanotubes can be used. Notably, when used as probe tips, nanotubes are susceptible to buckling rendering them less effective at detecting a surface contact. Advantageously, by applying the principles described herein a sufficiently low compressive force is needed to sense the surface of the specimen that even single-wall nanotubes can be used.

During a specimen height measurement, the probe tip 14 is brought into contact with the specimen and a force results which deflects the flexible cantilever 12. The magnitude of the force applied by the probe tip 14 onto the specimen 18 is proportional to the angle of cantilever 12 deflection. To measure the degree of cantilever deflection, the AFM further includes the laser source 26 which generates a light signal that is directed onto the surface of the flexible cantilever 12. The light signal is reflected from the cantilever 12 and is directed by a mirror (not shown) onto a photo detector 28. The photo detector 28 is preferably divided into four light responsive quadrants, a, b, c and d. Each light responsive quadrant generates an analog voltage signal which is proportional to the magnitude of reflected light incident upon it. A difference signal, which is equal to the signals (a+b)−(c+d), is calculated to determine the magnitude of deflection of the cantilever 12.

The scanner 10, cantilever 12, cantilever base 30, laser 26 and photo detector 28 are conventional elements known in the art. These components are sold as an assembly by Digital Instruments of Santa Barbara, Calif. under the trademark, MultiMode SPM.

As the probe tip 14 approaches a specimen, damping forces act upon the probe tip 14 owing to an effective viscosity increase of the fluid near the surface.

Figure 3:
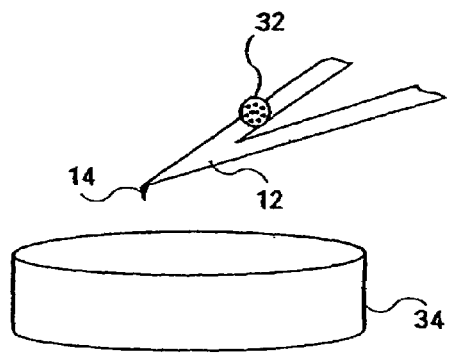
FIG. 3 is perspective view of a cantilever and cantilever pulse release system, formed in accordance with the present invention.

When the probe tip 14 contacts the surface of the specimen, adhesive forces frequently result which capture and retain the probe tip 14. This problem is exacerbated when the cantilever 12 is formed with a very low spring constant, which is required for the measurement of biological specimens. Therefore, an important aspect of the present invention resides in the ability to disengage the probe tip 14 from the surface of the specimen. To accomplish this, a magnetic particle 32 is affixed proximate the free end of the cantilever 12, as illustrated in FIG. 3. In a preferred embodiment, the magnetic particle is formed by bonding a particle of Samarium Cobalt to the cantilever 12 with a thermal epoxy. The particle can be previously magnetized by placing it in a magnetic field of approximately 3.5 Tesla.

The AFM also includes an electromagnetic coil 34 which receives current drive from a pulse release circuit 36 and generates an inhomogeneous magnetic field in response thereto. The magnetic particle 32 and electromagnetic coil 34 are arranged such that the magnetic field generated by the coil 34 when energized drives the magnetic particle 32 away from the surface of the specimen 18. Preferably, the coil 34 is formed and placed proximate the scanner 10 and the magnetic field is selected to repel the magnetic particle 32. In other embodiments, the coil can be placed above the cantilever 12 and generate an attractive magnetic force with the magnetic particle 32. In either placement, an opposite force used for restoring the cantilever 12 to a neutral position, can be generated by reversing the polarity of the current in the coil. The magnetic force is selected to be sufficient to overcome the adhesive force between the probe tip 14 and specimen 18. Such a force is generally achievable when the coil is formed with 50 turns of 22 gauge wire about a 0.25 in. diameter core, and is energized with a current on the order of 200 milliamps. However, as the adhesive forces encountered are variable, it is preferred that the level of magnetic field also be variable to insure that the probe tip 14 can always be released from the specimen 18.

To achieve the desired objectives, the present invention employs a novel control method for an atomic force microscope, such as that illustrated in FIG. 2. The control method, which generally takes the form of a computer program, is illustrated in the flow charts of FIGS. 4A–C. The control method of FIGS. 4A–C results in a controlled approach of the probe tip 14 to the specimen 18, a substantially constant range of motion of the probe tip 14 during successive measurement samples, very low contact force upon the probe tip 14 with no lateral force resulting between the probe tip 14 and specimen 18 and a sure release of probe tip 14 from adhesive forces presented by the specimen 18. Accordingly, the method of the present invention is ideal for use when working with biological specimens.

Through the above described continuous dual control of the cantilever base 30 and probe tip 14, at each pixel, both contact force can be reliably measured and profile height of the specimen can be obtained as the specimen is scanned. Additionally, since release is obtained by incrementally increasing a magnetic field, the adhesion force is automatically available for determination and recording in memory at the increment preceding the release. As a result, adhesion force mapping can also be performed on a pixel by pixel basis during scanning. Thus, as the scan proceeds, complete data regarding the contact force, profile height and adhesion force of the specimen at every point in the raster scan is immediately and visually available.

Measuring compressive (contact) and tensile (adhesion) force along with sample height at each pixel further allows for analysis of single-molecule reactions. To do so, the tensile (chemical) force inherently measured by the release pulse at each increment of the magnetic force ramp is calculated and stored. Thus, forces can be accurately measured at sub-nanometer intervals of separation between tip and specimen. Feedback may optionally also be introduced in order to stabilize the probe position after release, as the chemical force begins to decrease. In this way, the entire force/separation curve of two reacting molecules is measurable, with the integral of that curve being the reaction energy.

Commercial DSP's provide a pixel scan rate of 400 Hz in a present embodiment and with obvious modifications can cover the range of scan rates between 100 pixels/sec or less and up to 1000 pixels/sec. Moreover DSP's becoming available are 30 times faster and will allow pixel scan rates well in excess of 1000 pixels/sec. The computer program implements both the force sensing and control aspects of the cantilever during the incremental approach and contact with the specimen, creates the magnetic force ramp during the first part of the withdraw cycle (while holding the specimen base fixed) and detects separation of the tip from the specimen while storing the adhesion force=magnetic force measured at that time.

Figure 4A:
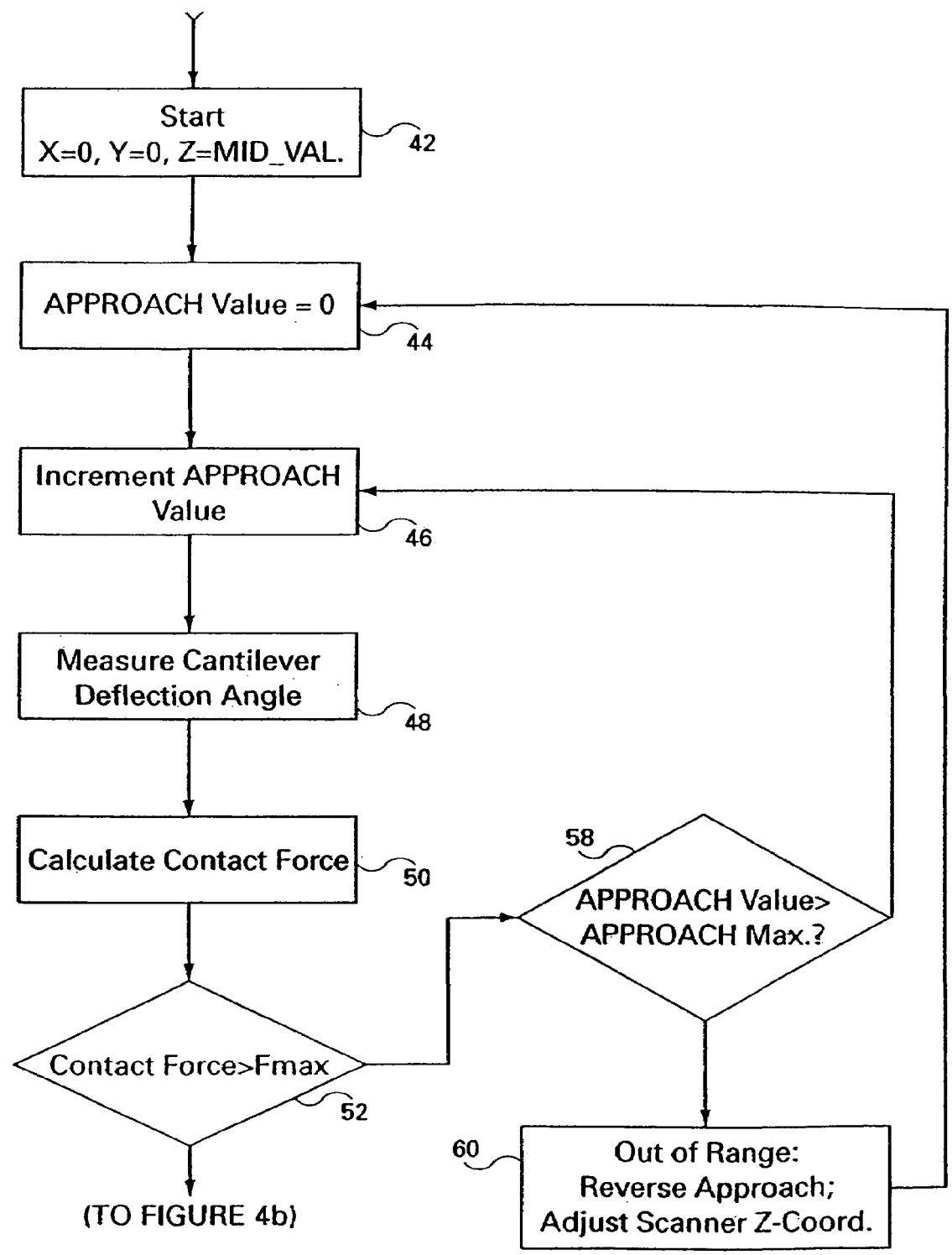
FIGS. 4A–C are flow charts illustrating the operation of a sensing mode atomic force microscope formed in accordance with a method of the present invention.
Figure 4B:
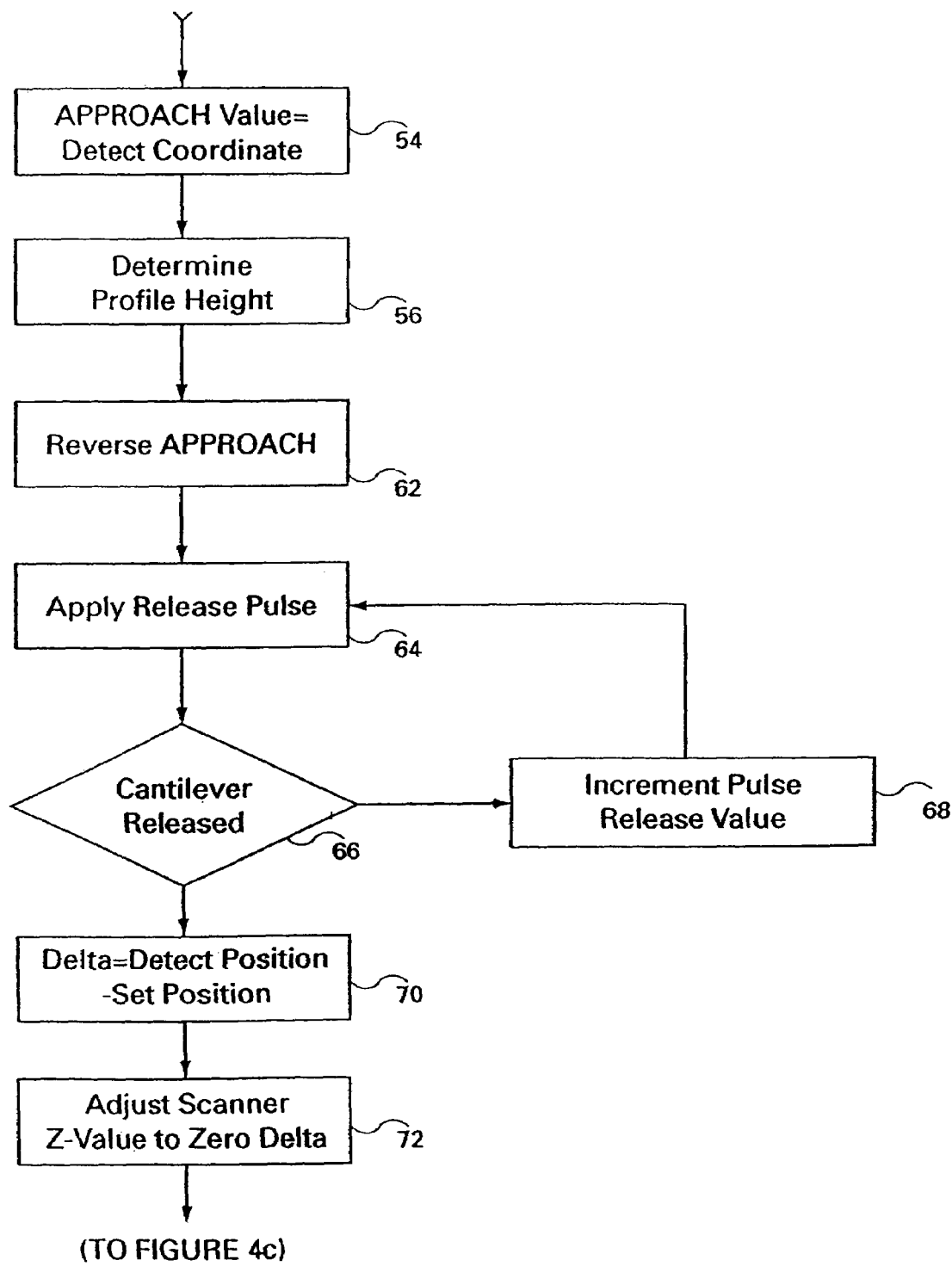
Figure 4C:
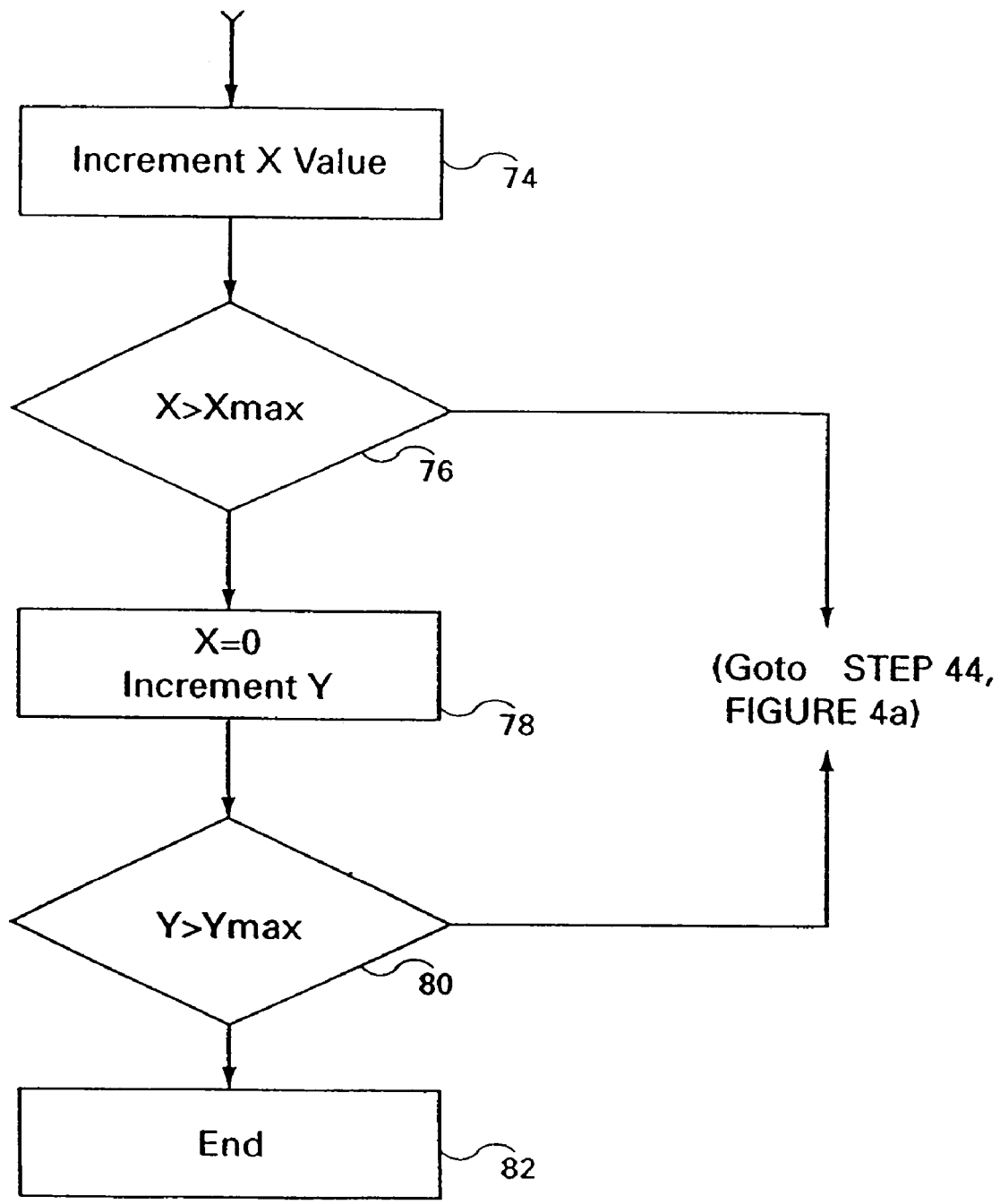

Referring now to FIGS. 4A–C, operation of the AFM begins with the initialization of the X, Y and Z positions of the scanner 10 (step 42). The X and Y piezo elements are driven to a datum coordinate (0,0) and the Z-piezo element 24 is placed approximately the center of the range of motion. The approach value, which is provided by the sensing mode controller 40 to the cantilever base 30, is also initialized to zero (step 44).

After initialization, the sensing mode controller circuit 40 increments the approach value, thereby moving the cantilever base 30 in a direction towards the specimen surface 16 (step 46). After incrementing the approach value, the sensing mode controller 40 monitors the signals from the photo detector 28 and determines the cantilever 12 deflection angle (step 48). From the measured deflection angle, the sensing mode controller 40 calculates the force on the probe tip 14 (step 50). The sensing mode controller 40 then compares the measured force against a predetermined maximum force value to determine whether the probe tip has contacted the specimen (step 52). The maximum force value is preferably selected to be the minimum value which will reliably indicate a contacting force between the probe tip 14 and specimen. Suitable thresholds of between 35 and 150 piconewtons (pN) have been successfully practiced. Typically 70 pN provides an adequate threshold level. Advantageously, sensing mode permits selection of compressive force at detection of contact (i.e. detection threshold) typically in the range 35 to 150 piconewtons, although a lower threshold can be used. As a result, a lower compressive force on approach results in a lower adhesive force on pull-off, aiding in preservation of biological specimen structure. Threshold values lower than 35 pN are considered achievable as significantly softer cantilevers become commercially available.

If the probe tip 14 has contacted the specimen, the approach value is stored as the detection coordinate to calculate the profile height of the specimen (step 54). The specimen profile height is then determined by combining the current Z coordinate position of the scanner 10 with the detection coordinate (step 56). At contact, a lower Z-value for scanner 10, and a lower detection coordinate on the ramp, each signifies a higher profile height. So these two variables must be added (after multiplying each by a constant to convert digital value to height) and finally the sign changed. The specimen profile height value represents the height of the specimen at the current X, Y position and can be displayed graphically as the intensity and/or color of a pixel at that two dimensional coordinate, in a manner well known in the art of atomic force microscopy.

Returning to step 52, if the probe tip 14 has not contacted the specimen, the controller then determines whether the approach value has exceeded an allowable limit (step 58). The range of approach values is determined by the required force resolution and the range of motion achievable from the cantilever base 30. Preferably, a digital to analog converter within the sensing mode controller 40 provides at least 200 incremental approach values as illustrated in FIG. 5A (approach maximum=200). This allows an angstrom by angstrom approach of the cantilever base 30 toward the specimen at every pixel. In general, the timing is such that each 5 μsec the DSP issues a command to the piezo that drives the cantilever base, and also to the coil that provides the magnetic coil drive. Accordingly, there are typically about 200 pairs of commands during the advance part of the cycle alone. Also each 5 μsec, the DSP learns the cantilever deflection angle by analog to digital conversion of the reflected laser beam's detector output, and the cantilever base position by similarly reading the cantilever base piezo voltage.

If the approach value is within the acceptable range, generally between 10–50 nm (typically 15 nm), the program returns to step 46 where the approach value is incremented.

Steps 46–52 and step 58 are performed in such a way as to generate a controlled approach of the cantilever base 30 towards the specimen 18, as illustrated in the graphs of FIGS. 5A and 5B. The approach begins with a gradually descending portion 84. The curved initial approach, which can be generated by a sinusoidal function or other suitable function, minimizes the initial acceleration of the cantilever base 30. This minimizes the excitation of oscillations in the free end of the cantilever 12 and enhances measurement accuracy. The approach then is characterized by a linear segment 86. The linear approach of the present invention together with a minimum practical approach distance minimizes the velocity of the cantilever at contact and allows the probe tip 14 to contact the specimen with minimal contact force, essential for low damage to biological specimens and the soft high polymers of materials science.

If the approach value exceeds the maximum value (step 58 is true) the sensing mode controller 40 withdraws the cantilever base and applies a signal to the Z-piezo element 24 of the scanner 10 to reduce the separation between the cantilever base 30 and specimen surface 16. A high voltage amplifier 42 is preferably interposed between the sensing mode controller 40 and scanner 10 to generate the ±200 volt signal required to drive the piezoelectric element. A suitable high voltage amplifier, model number PA87, is manufactured by Apex Microtechnology of Tucson, Ariz. After adjusting the scanner height (step 60), program control is directed to step 44 where the approach value is again initialized to zero.

After the probe tip 14 contacts the specimen 18, adhesive forces act to hold the probe tip in place, even when the cantilever base 30 and specimen 18 are moved away from each other. This problem is especially acute when soft cantilevers (k<0.1 N/m) are used. The method of the present invention overcomes this problem by coordinating the withdrawal of the cantilever base 30 with the application of a force on the probe tip 14. Moreover, the magnetic force can be applied in precise increments enabling the measurement of adhesion force versus separation.

After the specimen profile height is determined (step 56), the magnitude of the approach signal is reduced, thereby moving the cantilever base 30 away from the specimen (step 62). Preferably, the approach signal is initially reduced (FIG. 5A) or paused and then reduced (FIG. 5E) gradually to effect a gradual change in slope, thus avoiding instability of the cantilever 12. In order to release the probe tip 14 from the specimen 18 either during the pause (FIGS. 5F and 5G) or when the cantilever base 30 starts to withdraw (FIG. 5C), the sensing mode controller 40 applies a pulse release signal to the pulse release circuit 36.

In response to the pulse release signal, the pulse release circuit 36 generates a suitable current pulse which energizes the electromagnetic coil 34. The electromagnetic coil 34 generates a magnetic field which repels the magnetic particle 32, and thus the probe tip 14, away from the specimen 18. The sensing mode controller circuit 40 monitors the deflection angle of the cantilever to ensure that the probe tip 14 in fact is released (step 66). If not, the sensing mode controller circuit 40 either requests intervention by the operator to increase the pulse size for this experiment or increments the value of the release pulse release signal (step 68) and reapplies the pulse (step 64). When the sensing mode controller circuit 40 is adjusting the pulse release signal, steps 64–68 are repeated, typically for a maximum of 64 increments, until the magnetic force overcomes the adhesive force between the specimen 18 and the probe tip 14 or a predetermined maximum pulse release signal is reached. The speed of commercially available DSPs allows the use of 64 levels of current in the coil which provides a measurement precision of approximately 2%. If higher precision is desired, faster DSPs are becoming available and can be employed.

The coil current is increased from zero in a defined stepwise manner at defined time intervals under program control. The force scale is calibrated by measuring the cantilever deflection voltage at the maximum (i.e. kth level current where k=the maximum number of levels) and separately producing the same deflection voltage by advancing the specimen piezo—which is calibrated absolutely in nm. In this way the nm deflection of the cantilever at maximum coil current is determined. Multiplying by the force constant of the cantilever gives the magnetic force at maximum coil current, with the steps being in increments of 1/k of the total if all levels are used. Although the magnetic force required to achieve release is a function of tip 14 to specimen adhesion, typically a few hundred pN or less will suffice. Moreover, for non-low adhesion probe tips, a magnetic release force of approximately 10 times the contacting force has been found to be a useful estimate of the actual release force.

As will be described in greater detail below, a maximum of 64 steps may be chosen to encompass 100 pN and up to 1000 pN or more. At the lower setting, sensitivity (1.5 pN) and precision of approximately 2% provides very satisfactory knowledge of the adhesion force in the range exerted for weak chemical forces such as the hydrogen bond. The upper ranges are appropriate for covalent force interactions. These force ranges are appropriate for detecting non-covalent forces between molecules and characterizing covalent bond formation during chemical reactions.

FIG. 5C illustrates exemplary cantilever deflection versus time for the approach depicted in FIG. 5B. During the linear portion of the approach 86 the cantilever 12 experiences little deflection from a neutral position 92. Depending on the material being sampled and the construction of the probe tip 14, attractive forces may be present which draw the probe tip into the specimen. This results in a negative deflection 94 of the cantilever 12. Upon contact of the probe tip 14, the cantilever 12 begins positive deflection 96. This is the condition detected by the sensing mode controller 40 at step 52. At that point the cantilever base 30 is withdrawn and the pulse release signal is applied, deflecting the cantilever 12 in a positive direction 98. Because the cantilever 12 is operating in a fluid environment, the cantilever deflection 98 is damped and is characterized by an exponential function. Upon termination of the release pulse 100, the cantilever returns to the neutral position in an exponentially decaying fashion 102. In order to accelerate the return to the neutral position, a reverse polarity pulse signal can be applied to the coil 34. This creates an attractive force sufficient to overcome the spring constant of the cantilever 12 as well as the fluid damping. An example of this is illustrated in FIG. 5D.

After the probe tip 14 is released and the approach signal is decremented to zero (90, FIG. 5B), the program determines the distance traveled by the cantilever base 30 during the last sample. Since it is preferable for limiting the contact force on the specimen during measurement to use a minimum practical approach distance, the specimen height change that can be stored in the variable representing the detect position is limited. Therefore, the sensing mode controller circuit 40 generates a delta value by subtracting a predetermined "set value" from the actual value traveled by the cantilever base 30 during the last approach (step 70). The set value is normally chosen near the midpoint of the linear ramp of FIG. 5A. The sensing mode controller 40 then adjusts the height of the Z-piezo element 24 of the scanner 10 to reduce the delta value to zero on the next approach (step 72). In this way the Z-piezo element 24 functions as the accumulator or integrator of deltas generated by the detect position which therefore equals the Z-value or specimen height at this particular x-y position or pixel. Z is stored for each of the X-Y pixels in memory contained in Sensing Mode Controller 40, where it is available for analysis and display. The range of heights that can be generated by the Z-piezo element 24 is several thousand nanometers, which is entirely adequate for the range of specimen heights encountered in biological experiments. A useful by-product of this method of operation is the achievement of substantially constant timing and substantially constant distance of travel in the approach of the cantilever base 30 to the specimen 18 during successive samples.

While the method of FIGS. 4A–C has been described with the cantilever base 30 being controlled to effect the approach and withdrawal of the probe tip 14 and the scanner 10 being controlled to minimize the delta value, those skilled in the art will readily appreciate that these functions can be exchanged without deviating from the improved methods of the present invention. To effect such a change, the range of motion of the cantilever base 30 is preferably increased from several hundred nanometers which is commonly used, to several thousand nanometers so that a broad range of delta values can be corrected.

Upon completion of step 72, the X-Y controller 38 then operates to effect a conventional raster scan of the specimen relative to the probe tip 14. The X-Y controller 38 increments the X coordinate value (step 74) of the scanner 10 and determines whether the end of the row has been reached (step 76). Typically, each row contains either 256 or 512 coordinate values.

If the end of the row has not been reached, the program control returns to step 44. If the end of the row has been reached, the X coordinate value is reset to zero and the Y coordinate value is incremented (step 78).

Alternatively, the program can increment the Y coordinate value and decrement the X coordinate value for successive measurements until X=0. In this way, a serpentine scan is achieved. The X-Y controller 38 then determines if the final Y coordinate value has been reached (step 80). Generally, the Y axis will include the same number of coordinate values as the X-axis, thereby generating a square image matrix. If the final Y coordinate value has not been reached, control returns to step 44. If the final Y coordinate value has been reached, the image scan is complete and the program ends (step 82).

The process described in FIGS. 4A–C is referred to by the inventors as "sensing mode." This is because the sensing mode controller 40 senses when initial contact is made between the specimen and probe tip 14 and immediately (typically within 5 microseconds) begins retraction of the cantilever base 30 and probe tip 14. The method and apparatus of the present invention significantly reduces the velocity of the probe tip 14 at contact with the specimen 18 and therefore reduces the resulting contact force between the probe tip 14 and the specimen 18. By reducing the contact force, specimen destruction is minimized. The inclusion of the magnetic particle 32 and pulse release coil 34, operated in accordance with the sensing mode method of the present invention, allows the use of a cantilever 12 with a spring constant significantly less than 0.1 Newtons per meter (N/m) without the risk of the probe tip 14 being retained by the adhesive forces exhibited by the specimen. With sensing mode, the lower limit on acceptable cantilever spring force is bounded only by cantilever manufacturing constraints. The use of such a soft cantilever further reduces the compressive force between the probe tip 14 and the specimen 18 during contact, making it possible to reduce specimen damage even further.

As an additional benefit of the significantly reduced contact force, significantly smaller probe tips 14 can be used in sensing mode with reduced risk of tip breakage. Probe tips significantly less than 10 nm, for example, 6 nm (60 Angstroms) in diameter have been successfully used in fluids with the sensing mode scanning method of the present invention.

As a further advantage resulting from the continuous sensing process of sensing mode, a high-speed algorithm can compute a running linear least squares fit for as many as 20 or more successive readouts of the cantilever deflection signal (angle), with update of the least squares fit each 5 microseconds as a new digital value for deflection value is presented to the program. Thus, continuous sensing makes possible a low-noise running fitted average to both tip position and tip velocity (slope of the least squares fit). Because the averaging time of the fit can extend over several cycles of the damped vibrational period of the cantilever, thermal noise in the averaged cantilever signal is strongly reduced and noise in the detected position of the surface is lowered correspondingly. The running least squares fit can be used in a variety of sensitive algorithms for detecting contact with the surface at low force. One such is to define contact with the surface as that point during the approach where the velocity of the tip, which is the same as the slope of the least squares fit, changes from negative (down) to positive (up). Tests with this definition have shown an ability to detect the surface with substantially smaller force exerted on the specimen.

Still another advantage of the present invention is in the mode of adjusting the specimen piezo Z to reduce the deviation in contact position from the set position. In contrast to contact mode and tapping mode, sensing mode as described herein can be configured to carry out adjustments to the Z specimen piezo without a differential equation. Once each x-y location, the electronics determines how far the surface detection point deviates from a pre-assigned vertical or Z set point (typically at the midpoint of the total approach distance) and immediately corrects the deviation by adjusting the specimen piezo. One measured constant, the ratio of sensitivities in nm/volt of the cantilever base piezo and specimen piezo suffices to determine quantitatively the correction.

Depending upon the particular implementation, it may be desirable to make corrections over a multiple of pixels to avoid the introduction of noise associated with making the entire correction at once. Thus, correction can be introduced over a few pixels, e.g., 80% the first pixel, arriving at 96% correction the second pixel, etc. A simple, but exact, theory enables one to know the final correct height at the first pixel even though the lower piezo has not yet reached the final height. Therefore the corrected height can be recorded each pixel along with the achieved height. The formula for the correction is $S_n = Z_n + D_n(\gamma_0 - \gamma)$; where $S_n$ is the corrected surface height, $Z_n$ is the height actually reached after one application of the partial correction (80% in the example), and $D_n$ is the deviation of the surface detection point from the set point, all at pixel "n". By convention, $S_n$ and $Z_n$ are in volts applied to the specimen piezo or in counts applied to the D/A converter that produces that voltage. Similarly, $D_n$ is volts applied to the piezo attached to the cantilever base or counts applied to its converter. $\gamma_0$ is the factor converting cantilever piezo counts to sample piezo counts, measured experimentally and found to be within a factor of 2 either way of unity. If the sample piezo is corrected by $\gamma_0 D_n$ for a deviation $D_n$, then the whole height deviation would be corrected at once by the specimen piezo motion. $\gamma$ is the factor, smaller than $\gamma_0$, that produces the correction actually used, 80% of $\gamma_0$ in the example. As a result, the true height, $S_n$, is the actual height $Z_n$ plus the extra correction not yet applied in the first correction because $\gamma$ was chosen too small. In practice, $Z_n$ contains the low frequency variation of the specimen surface and $D_n$ the high frequency. $D_n$ and $S_n$ can be displayed in neighboring windows for visual analysis.

By employing the techniques described herein, relating to adhesion force, through iterative application of an increasing coil current to effect release of the probe tip at each pixel, we necessarily identify the time at which the release force is overcome. Advantageously, measuring the force at the time of pull-off quantifies the adhesion force. Moreover, since the adhesion force is measured during the same approach/withdraw cycle that measures specimen height, the adhesion force can be mapped in exact register with the topography and at the same resolution, whatever resolution is used. As a further advantage resulting from the continuous sensing process of sensing mode, since a quantitatively ramped magnetic force is applied just after surface detection, determination of the point at which the adhesion force is overcome also isolates and quantitatively measures the adhesion force. Moreover, because both the approach and release are done incrementally, storing the forces for each increment at each pixel enables mapping of force as a function of distance from the surface of a specimen. This feature thus provides concurrent mapping of topography with adhesion force at high resolution.

An atomic force microscope formed and operated in accordance with the present invention can also be used to reduce the time for the cantilever to approach an equilibrium angle at certain phases of the approach/withdraw cycle. By applying a reverse current pulse in magnetic drive coil at the termination of the cantilever pulse release signal, the return of the cantilever to its equilibrium angle is accelerated so the next approach can begin immediately. A brief current pulse of the same sign as the main release pulse but at the beginning of the main approach ramp speeds up arrival at the new equilibrium angle associated with linear approach, simplifying subsequent detection of the surface.

Another valuable feature is an optional pre-scanning or zoom mode. Since the detailed behavior of the cantilever is controlled by the DSP program for each pixel, one can make a change to the x or y position corresponding to each pixel simply by changing the appropriate variable at the end of tip withdrawal and before the next advance. In this manner, areas of interest can be quickly located. To do so, the program that controls the tip advance and withdrawal maintains a running count of the 1 through 256 pixel number, for example, and the 1 through 256 scan line number and creates a 256×256 table in memory. This allows looking up in the table the voltages that should be applied at any given pixel to the piezo scanner of the microscope. These voltages are output to the microscope, first x and then y, by a single D to A converter and are held separately in two sample-and-hold circuits for application to the microscope. The lookup table itself is prepared by having the microscope scan a calibration grid. Separate lookup tables can be stored and used for each scan size and for any other scan variables found necessary, since the storage required is minimal.

After a molecule or interaction region of interest is located in a field, reduction in the scan size to encompass just the event of interest can be done. This makes the machine more responsive in studying biological function. In one embodiment, a scan of 400 pixels per second is equivalent to a field of 40×40 pixels (200 Angstrom×200 Angstrom at 5 Angstrom pixel separation) each 4 seconds, for example, to allow following the evolution of structure in biochemical reactions. Since biological rates can often be manipulated by changes in temperature, pH or concentration, this invention provides means of observing changes in physiologically relevant biological structures.

A further advantageous byproduct of the sensing mode configuration and method is that it also reduces the possibility of damaging a probe tip on initial engagement. We have been able to make use of a highly characteristic change in cantilever response to the magnetic release pulse (which occurs each pixel) related to the increase in effective viscosity near the surface. This change allows reliable prediction of when contact with the surface of the specimen will occur. Initial tip engagement occurs only once each measurement session. Activation of the stepping motor for engagement requires repeating a sequence of four pulses phased properly in time. However, according to prior art systems, the operator has no way of knowing when the surface will be encountered, which can induce a painfully slow approach to avoid tip damage. With sensing mode operation, this problem is overcome. A repeated approach/withdraw cycle, typically 15 nm in amplitude of the format shown in FIG. 5E, is initiated by the program before engagement starts. The cycle includes the magnetic release pulse as part of each withdrawal. FIG. 6 shows the cantilever deflection signal for approach/withdraw cycles at several stages of engagement.

When the cantilever tip is nowhere near the specimen, the cantilever response as indicated by the deflection signal, has a certain shape, 662, that includes one or a few cycles of 'ringing' after the release pulse is over. However, as the engagement motor continues to run and the tip approaches the sample, the ringing decreases 664 and nearly disappears, 666, just before contact, 668, is made. This is due to the increased viscosity seen by the cantilever in the immediate vicinity of the sample owing to restriction of flow lines. While the initial engagement portion of the program is running, the program looks once each approach/withdraw cycle for the amount of cantilever ringing and reduces the engage motor speed appropriately. In addition, because the approach/withdraw cycle is in continuous operation, feedback from the position (fraction of the 15 nm range) at which the tip encounters the surface to the position of the specimen piezo, can also be in operation so that when the surface is encountered, the specimen piezo retracts smoothly to keep the surface encounter position at the set point. The net effect is that it is practically impossible to crash the tip into the specimen or damage it by excessive force.

FIG. 7A is an example display of information available through use of the invention to scan a DNA sample. As shown, the upper graph is the force data at pixel 3 of scan line 93 (where pixel zero is to the left and scan line zero is at the top) out of a 256×256 pixel image. The lower graph contains a representation of the specimen piezo position and the deviation from a set position.

FIG. 7B is an enlarged version of the Height image 772 from FIG. 7A. The image area, 776, is contained within a field of 256 by 256 points (i.e. pixels). To the right of the image area, 776, is a scale, 778, correlating a shade (color) with a count value, representing, in counts, the height of the specimen at each of the points.

Above the graphs in FIG. 7A are pull-down menus through which the various program features may be accessed. Along side the graphs are three images which are obtained concurrently during scanning. The upper image, 770, labeled "Detect" plots the surface detection position at each pixel expressed as deviation from the set position. The middle image, 772, labeled "Height" plots the specimen height at each pixel using the corrected specimen piezo position (Sn referred to above). The lower image, 774, labelled "Adhesion" plots the measured adhesion force at each pixel using the pull off step, converted to piconewtons. In each, the corresponding scan line 93 is indicated.

FIG. 8 is an excerpt of the graphs of FIG. 7. In the upper graph, the "Force Curve" is the heavy black line, 882, plot of cantilever deflection vs. time. Each unit of the abscissa represents 5 μsec, which is the interval between computer interactions with the microscope. The units of the ordinate represent picoNewtons. The horizontal dashed line, 884, (red), is the detect threshold. As shown, for a 15 nm approach distance, each interval represents ¾ of an Angstrom. From 0 to 98 units the cantilever is approaching the specimen under control of the cantilever piezo. At 98 units, cantilever deflection crosses the detect threshold (here 70 pN), and the program brings the cantilever base piezo smoothly to a halt. The magnetic force ramp then begins incrementally increasing. At approximately 138 units, i.e. after approximately 40 steps in the ramp, the tip pulls loose, 886, and the cantilever in this case goes to 2 Volts. This 10-fold increase in deflection is detected by the program. The increment or step at which the deflection crosses a second threshold (here set at twice the height of the detect threshold line) is defined as the pull-off step, and the magnetic force at this point is the measured adhesion force for this pixel.

The lower graph in FIG. 8 describes what happens over the entire scan line 93. Two lines are superimposed over each other. The fine line (blue), 188, records the deviation of the detect position (98 units for pixel 3 above) from a set position, typically 120 units. The heavy black line, 890, is the specimen piezo position, which is obtained by feedback from the detect position as described above. Line 93 passes through three segments of DNA in the Height image, 772, and these crossings appear as three pronounced dips in the lower graph.

FIG. 9 is an image of several DNA strands imaged in Hepes-Ni$^{2+}$ buffer on Aptes-mica with Si3N4 tips obtained using the techniques described herein. As shown, the image 904, on the left is a height profile of a portion of the DNA. The bar 906 represents 24 nanometers for the x or y directions. Original field size was 220 nm. The scale, 908, below the height profile image 904 represents the heights in nanometers (nm) converted in a color or grey-scale representation. Image 902 is an enlarged portion of the adhesion force image 910, showing structure in a segment of DNA occurring at the highly significant spacing of the 10 base pair repeat distance of DNA. An adhesion force image 910 is in the same register and x-y scale as the height profile image, 904. The scale 911 below the adhesion force profile image 910 represents the adhesion force in nanonewtons (nN) converted in a color or grey-scale representation. The adhesion force map of FIG. 9 (right panel) was acquired simultaneously with the topography map of FIG. 9 (left panel) in real time at the same resolution as the topography. Such maps provided by this invention, to our knowledge, represent the first real time high resolution adhesion maps available as a consistently present adjunct to topography for interpretation of the image.

FIG. 10 is a higher magnification image of one DNA strand imaged in FIG. 9, which was obtained by a new scan done at a smaller field size. The five ridges marked "A" in the height image of FIG. 10 correspond to the five repeats of the double helix marked "B" in the X-ray image of the DNA. This rescan demonstrates that the initial scan using the dually controlled cantilever of this invention leaves the DNA sufficiently intact to provide higher resolution on the succeeding scan. The original field was 50 nm. The bar represents 5 nm.

While there have been described what are presently believed to be the preferred embodiments of the invention, those skilled in the art will realize that various changes and modifications may be to the invention without the departing from the spirit of the invention, and it is intended to claim all such changes and modifications as fall within the scope of the invention.

What is claimed is:

1. A method of moving a cantilever of an atomic force microscope, said method comprising:
    a) moving the cantilever towards a specimen in a non-linear manner with respect to time during a first approach segment, wherein the first approach segment applying a curved initial approach function to the cantilever while the cantilever approaches the specimen, and
    b) moving the cantilever towards the specimen in a linear manner with respect to time, during a second approach segment that follows the first approach segment, until the cantilever contacts the specimen.

2. The method of moving a cantilever of an atomic force microscope according to claim 1, wherein the curved initial approach function is a sinusoidal function.

3. The method of moving a cantilever of an atomic force microscope according to claim 2 wherein the curved initial approach function is a non-sinusoidal function.

4. A method of imaging a biological specimen using an atomic force microscope, wherein said method of imaging comprises
    providing a biological specimen; and
    imaging the biological specimen by moving a cantilever of the atomic force microscope according to the method of claim 1.

5. The method of imaging a biological specimen using an atomic force microscope according to claim 4, wherein said biological specimen is DNA.

* * * * *